219-121 SR
7/6/82 OR 4,338,509

United States Patent [19]

Bartuska et al.

[11] 4,338,509

[45] Jul. 6, 1982

[54] PROCESS OF AND APPARATUS FOR PRODUCING A HOMOGENEOUS RADIALLY CONFINED PLASMA STREAM

[75] Inventors: Miloslav Bartuska; Karel Zverina; Josef Szabo; Borivoj Pospisil; Petr Kroupa, all of Praque, Czechoslovakia

[73] Assignee: Vysoka skola chemicko-technologicka, Praque, Czechoslovakia

[21] Appl. No.: 206,979

[22] Filed: Nov. 14, 1980

Related U.S. Application Data

[63] Continuation-in-part of Ser. No. 144,169, Apr. 25, 1980, abandoned.

[51] Int. Cl.[3] ........ B23K 9/00

[52] U.S. Cl. ........ 219/121 PR; 219/121 PY; 219/121 PP; 219/121 P; 219/121 PV; 313/231.5

[58] Field of Search ...... 219/121 P, 121 PR, 121 PY, 219/121 PM, 121 PP, 121 PV, 121 PQ, 123, 76.16; 313/231.4, 231.5, 231.6

[56] References Cited

U.S. PATENT DOCUMENTS

| | | | |
|---|---|---|---|
| 3,508,106 | 4/1970 | Vecsernyes | 219/121 PR |
| 3,619,549 | 11/1971 | Hogar | 219/121 PP |
| 3,641,308 | 2/1972 | Couch, Jr. et al. | 219/121 PP |
| 4,119,876 | 10/1978 | German et al. | 219/121 PR |

FOREIGN PATENT DOCUMENTS

| | | | |
|---|---|---|---|
| 2401969 | 10/1974 | Fed. Rep. of Germany | 219/121 P |
| 590101 | 11/1975 | U.S.S.R. | 219/121 P |
| 624747 | 9/1978 | U.S.S.R. | 219/121 P |

*Primary Examiner*—B. A. Reynolds
*Assistant Examiner*—M. Paschall

[57] ABSTRACT

Process of radial stabilization and homogenization of a plasma stream and a liquid stabilized plasma burner for the realization of such process. The arc is stabilized by its passage through several orifice plates, stabilized by a whirl or eddy of cooling liquid, then passes through a nozzle and is bent toward the peripheral surface of a rotatable anode lying out of the main outlet plasma stream issuing from the nozzle. The liquid stabilized burner has a rod cathode placed in the arc chamber, the cathode being progressively fed into the arc chamber to from an arc therewithin.

8 Claims, 4 Drawing Figures

PROCESS OF AND APPARATUS FOR PRODUCING A HOMOGENEOUS RADIALLY CONFINED PLASMA STREAM

This application is a continuation-in-part of application Ser. No. 144,169, filed Apr. 25, 1980 abandoned.

The invention relates to a process of radial stabilization and homogenization of a plasma stream, and to an arc liquid stabilized burner for carrying out this process.

With known plasma burners, great attention is usually paid to accurate conduction of the arc in the channel between the cathode and the anode, expecially with the aid of a whirl or eddy of stabilization liquid. In the space behind the anode, however, certain discontinuities and axial displacements of the plasma stream from the ideal path defined by the axis of the outlet nozzle take place as well. These deviations which manifest themselves in the industrial usage of plasma burners, are undesirable, especially in operations which involve the accurate cutting or shearing of material. Such deviations, if we overlook the negative effects of surrounding media, are caused by certain arc shifts on the effective internal area of the ring anode employed. For the desirable guiding of the plasma stream, it is under the influence of an additional magnetic field usually produced by a coil concentrically arranged around the nozzle outlet. The use of this process, however, considerably complicates the whole process of plasma generation, and the routing of the plasma stream is strongly dependent on the magnetic field intensity of the coil used, the coil being disposed beside the arc and thus thermally very much exposed. As far as the burner is concerned, usually a rod electrode, often made of graphite is used; the active part of the electrode encroaches upon the arc chamber discharging into the nozzle which also forms a ring anode. This arrangement, however, has certain disadvantages, especially as regards the limited viability of the ring anode, the necessity of its intensive cooling, and with it the connected limitation of the accessible burner output while keeping acceptable the operation life time of the anode without the necessity of making large replacements. Arc stabilization is also a problem.

Known in usually used ways for the suppression of these disadvantages are various modifications of the channel between the arc chamber and the nozzle using throttle orifice plates, and then especially the tangential arrangement of a cooling liquid supply with the employment of the thus originated liquid whirl or eddy for the protection of the internal surfaces of the orifice plates and nozzle. Even in this embodiment, however, there remains as a problem the questions of attaining satisfactory anode viability, the consumption of stabilization liquid, and the problems with arc, stabilization in the zone of the active internal anode surface.

In order to overcome these disadvantages, a construction has been proposed with electrodes formed by two coaxial rotating discs between which an arc is formed. This arrangement, which would substantially increase the useful life of electrodes, had a very unfavorable effect on the stability of the arc, and it was not used in practice. A further solution was proposed in which the cathode was replaced by two rotating discs disposed close to each other and driven by the reactive action of the cooling liquid. In a still further embodiment either the cathode or even both electrodes were replaced by rotating discs, and the arc was to be blown off through the nozzle by pressure in the arc chamber.

Not even these proposed solutions, however, have been used due to difficulties with arc stabilization.

Disadvantages of the known processes of formation of a homogeneous radially confined plasma strain in the zone behind the anode of the plasma burner are overcome by the process of radial stabilization and homogenization of the plasma stream in accordance with the invention. In accordance with such process, there is a concentration of charged particles (electrons and ions) between $2.00\times10^{24}$ and $0.3\times10^{23}$ per cubic centimeter in number and with a temperature between 15,000° K and 60,000° K. Also in accordance with the invention, the arc created between the front surface of a rod cathode arranged in the arc chamber of the burner and an anode arranged outside the arc chamber passes through at least two orifice plates, is stabilized by a whirl or eddy of cooling liquid led in a tangential direction into at least one of the spaces between the orifice plates or between the orifice plates and the nozzle. After passing through the nozzle hole and after leaving the nozzle, the plasma is bent in one direction towards the perimetric anode surface which lies out of the main outlet plasma stream from the nozzle.

Disadvantages of the known arc liquid stabilized plasma burners are overcome by the burner according to the invention. In such burner the anode placed outside the arc chamber is formed as a rotational body the axis of rotation of which includes, with the axis of the circular hole of the nozzle or with the plane passing through such axis and to it the nearest point of the rotational anode disposed closest to the circular hole of the nozzle is spaced a distance from the axis of the circular hole of the nozzle which is equal to or larger than the radius of the nozzle and smaller than the radius of the front surface of the cathode. The perimetric surface of the rotational anode can be diverted in the direction away from the nozzle. Such perimetric surface can be cylindrical, or conical diverted in the direction away from the nozzle. The rotational anode can be placed with respect to the burner body with the possibility of displacement around the axis provided by an adjustable mechanism or by interconnected holders firmly connected on the one side to the burner body and on the other side to the body of the rotational anode drive. The nearest point of the rotational anode to the axis of the circular hole of the nozzle can be deviated opposite the direction of rotation of the rotational anode with respect to the vertical plane led through the axis of the circular hole of the nozzle. A substantial improvement of homogenity and accurate radial confinement of the plasma stream is attained by the arrangement of an active anode surface rotating at a constant speed outside of the main plasma stream, and by given relations between the sizes of the nozzle, the anode, and the cathode. Not only does the burner have a high output with long service life, but it also has a precise arc path, and an increased stability. The viability of individual parts which are thermally the most exposed, especially the rotational anode, is increased by reason of internal liquid cooling.

Examples of embodiments of arc liquid stabilized plasma burners according to the invention are illustrated in the attached drawings, wherein.

Figure 1:
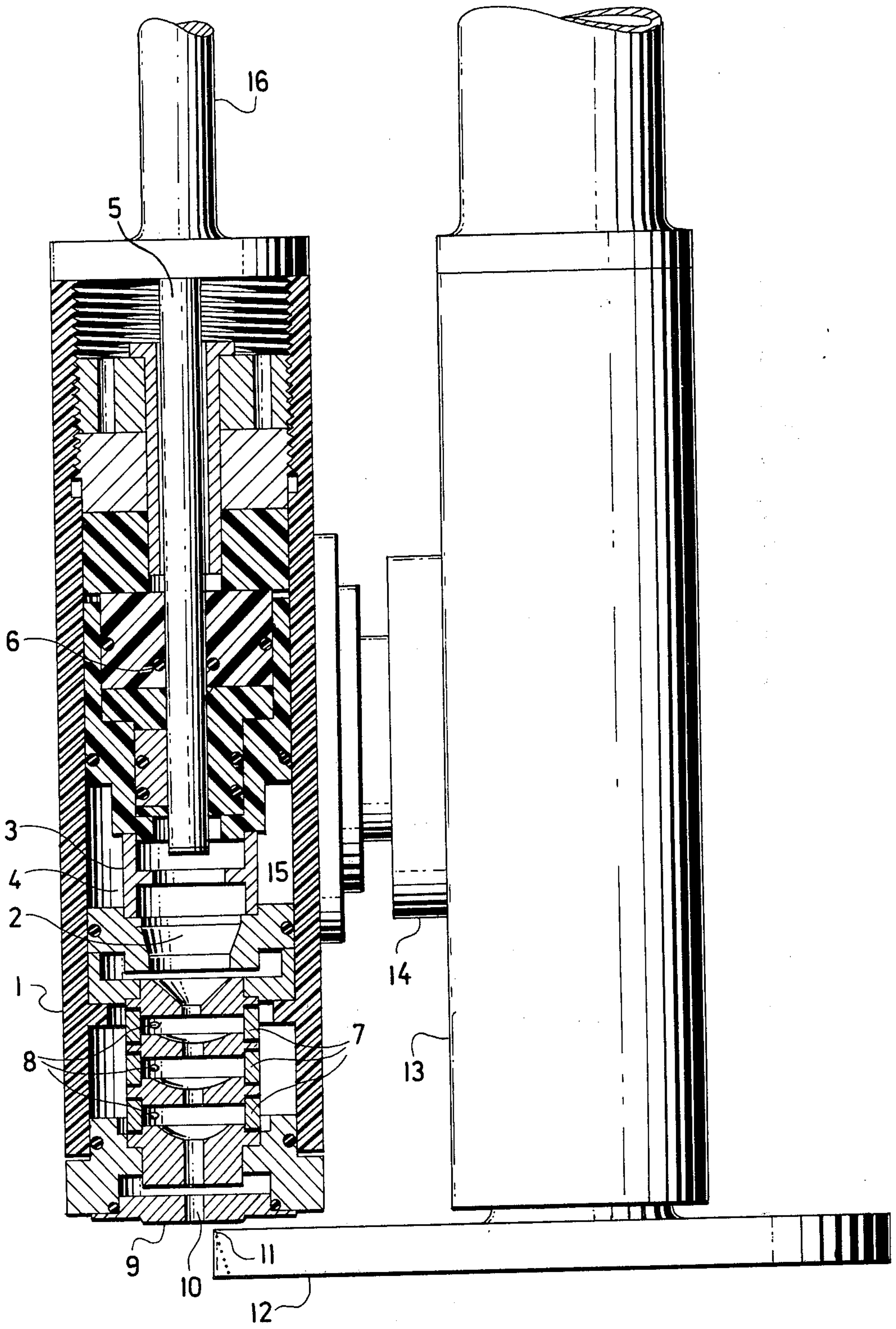
FIG. 1 is a view in side elevation of a first embodiment of the burner with the arc chamber shown in section.

As can be seen in FIG. 1, the burner consists of a body 1 of the burner with the arc chamber 2 thereof confined by an internal shell 3 between which the body 1 of the burner there is a space 4 for the circulation of cooling medium, for example, water. A rod cathode 5 sealed with a packing 6 protrudes into the arc chamber 2. Coaxial with the rod cathode 5 there are arranged orifice plates 7 of the stabilizing channel between which tangentially directed orifices 8 for the feeding of stabilization liquid, for example of ionized water, are disposed. In the front side of the burner body 1 there is raised a nozzle 9 with a circular hole 10 in the vicinity of which there is disposed the perimetric surface 18 of a rotational anode 12 mounted on the body 13 of an anode driving means. A mechanism 14 is provided to adjust the distance between the body 1 of the burner and the body 13 of the anode driving means. The adjustable mechanism 14 can be preferably adapted so that the body 13 with rotational anode 12 moves to compensate for anode wear in the course of its motion with respect to the hole of nozzle 10 and simultaneously inclines with respect to this hole and thus balances asymetric wear of the perimetric surface 18 of the anode. The adjustable mechanism 14 may be composed of holders fixed to both connected parts 1 and 13 and having adjustable means disposed between the holders and defining the proper distance of the displacement of the anode 12.

The rotational anode 12 is shown in FIG. 1 in the position in which its axis $O_2$ is parallel to the $O_1$ of the circular hole 10 of nozzle 9. As shown, it is so arranged that the upper edge 11 of its perimetric surface 18 is in the vicinity of circular hole 10 of nozzle 9 and spaced therefrom by a distance larger than the radius of hole 10 but smaller than the radius of the rod cathode 5. The rod cathode 5 has a plane front surface 15 arranged in this case perpendicularly to the axis $O_1$ of the circular hole 10 of nozzle 9. The rod cathode 5 is mounted in a feeding device 16 which feeds it downwardly into the arc, as required.

Figure 2:
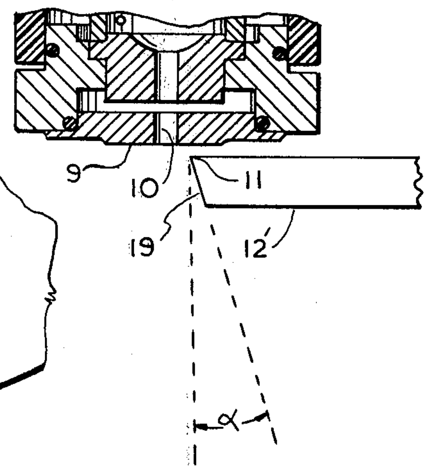
FIG. 2 is a plan view of the burner of FIG. 1 from the anode and nozzle side.

In FIG. 2 besides the mutual arrangement of the circular hole 10 of the nozzle 9 and the rotational anode 12 there can also be seen the inlet 17 for introducing additional pulverized or liquid material to the arc. The axis $O_2$ of the rotational anode 12 is in this case skewed with respect to the axis $O_1$ of the circular hole 10 of the nozzle 9.

Since the anode rotates at considerable speed (on the order of 1000 r.p.m.) a certain migration of electric arc occurs in the direction of its rotation during operation of the torch. The arrangement of the axis $O_2$ of the rotary anode in front of a vertical plane passing through the axis $O_1$ of the nozzle (clockwise rotation of the anode is assumed in the embodiment shown in FIG. 2) causes the arc to migrate from an optimum distance (the line connecting the axes $O_1$ and $O_2$) in the direction of rotation of the anode practically into a vertical plane below the axis of the nozzle, whereby it assumes an advantageous position with the arrangement of the inlet 17 for introducing a spray material in view.

Figure 3:
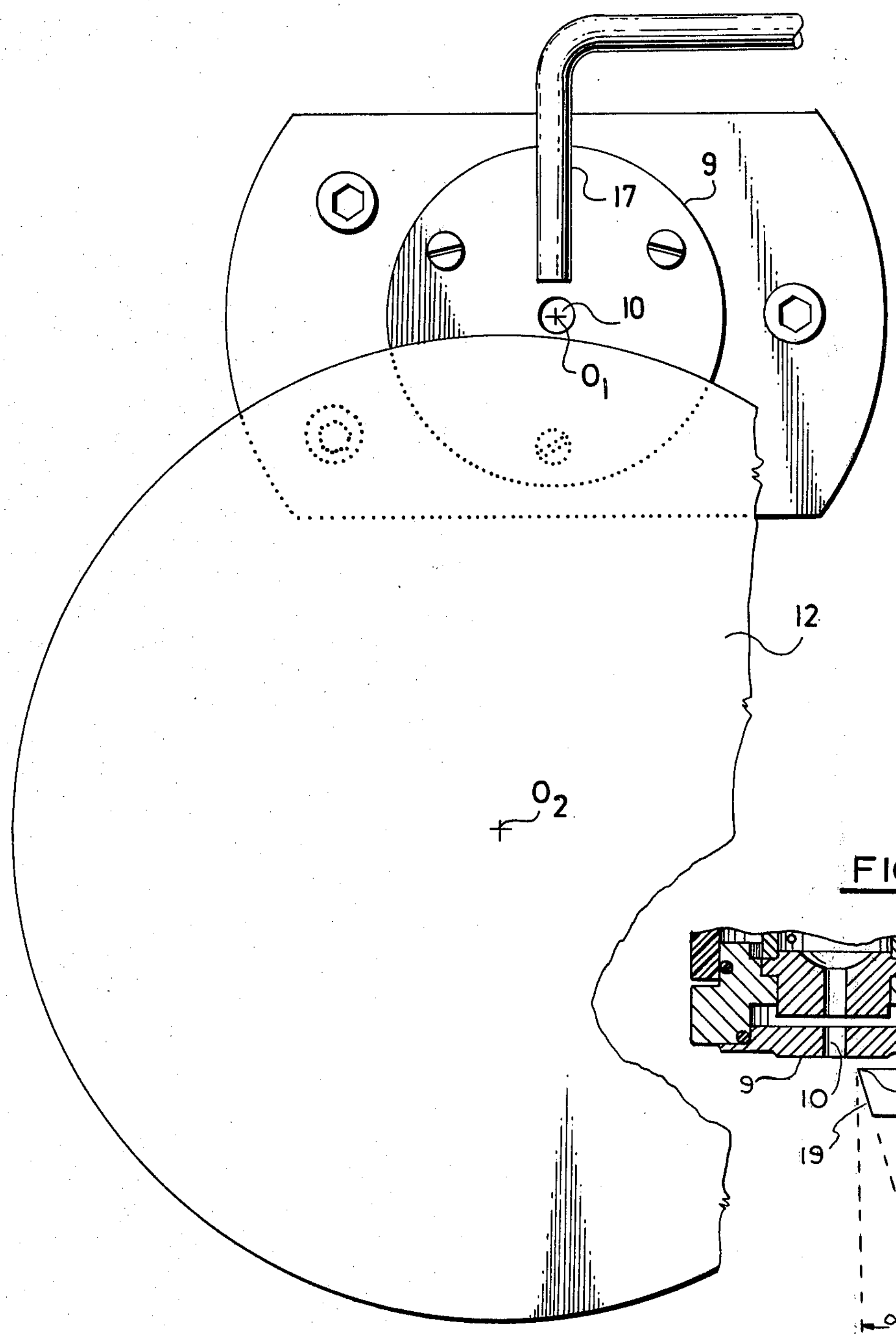
FIG. 3 is a fragmentary view in side elevation of a second embodiment of burner in accordance with the invention.

In FIG. 3 there is fragmentarily shown a second embodiment of the burner of the invention. In this embodiment, the parts contained within the body 1 of the burner are the same as those shown in FIGS. 1 and 2. The difference between the two embodiments, that is, that of FIGS. 1 and 2, and that of FIG. 3, is that the rotatable anode 12' of FIG. 3 has perimetric surface 19 of frusto-conical shape, the elements of surface 19 forming an angle alpha with respect to the axis $O_1$ of the circular hole 10 of nozzle 9.

The apparatus of the invention can be used where the axis $O_1$ and $O_2$ are parallel or even concurrent. In the interests of keeping a stability of the arc formed between them, however, the angle included between these axes should be relatively small, and should not exceed 20°.

Figure 4:
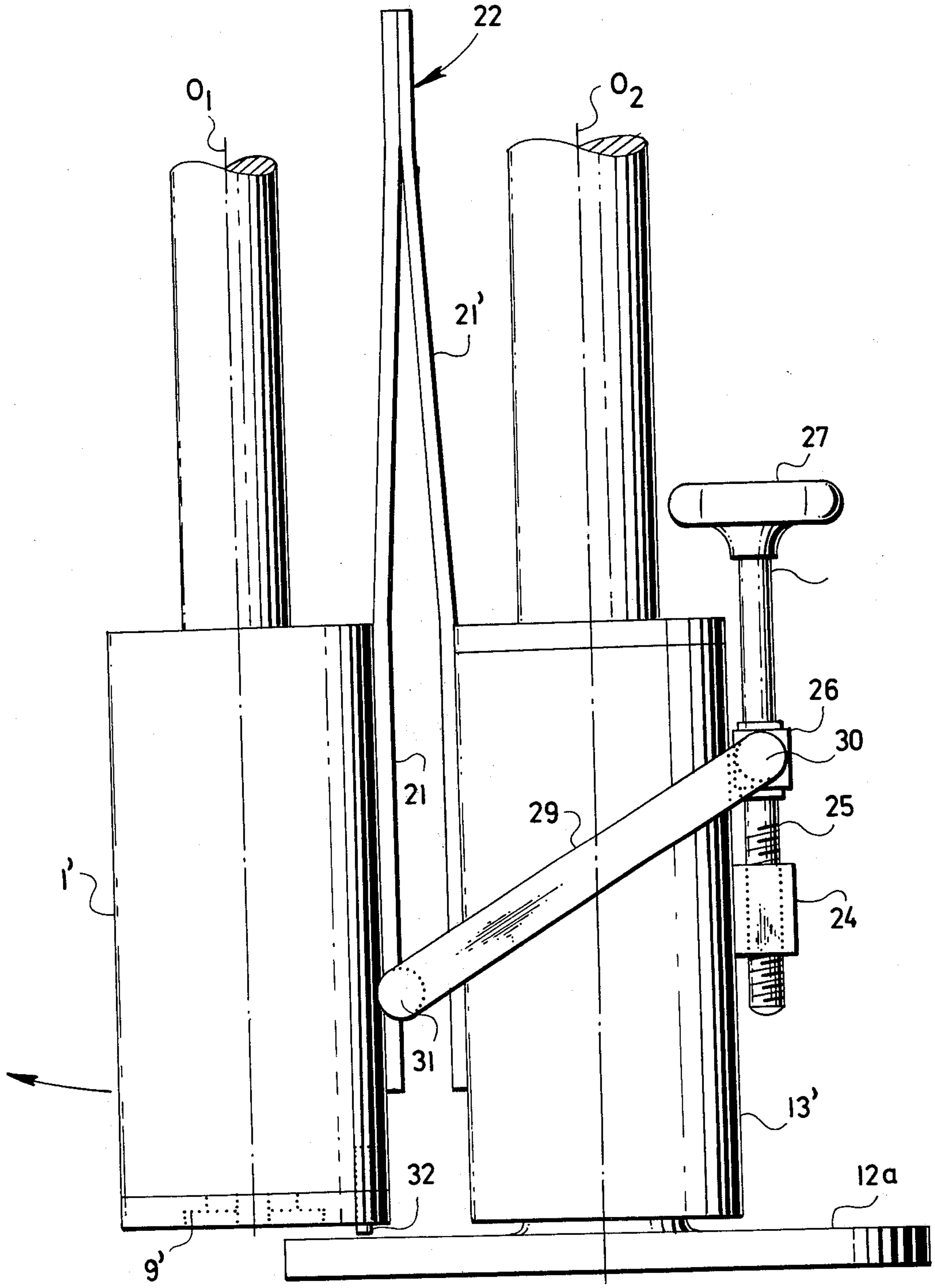
FIG. 4 is a fragmentary view in side elevation of a third embodiment of the apparatus in accordance with the invention.

In FIG. 4 there is shown a fourth embodiment of the apparatus of the invention. In such embodiment, a burner having a body 1' with a nozzle 9' is connected to and supported by two vertical leaf springs, spring 21 being attached at its intermediate part and lower end to body 1', and spring 21' being attached at its intermediate part and lower end to the body 13' of the driving means for anode 12*a*, the springs being attached to each other at their upper ends, as shown at 22. It is to be understood that the driving means for the anode is attached to fixed structure (not shown). The axis $O_2$–$O_2$ is thus fixed. The axis $O_1$–$O_1$ of the burner is adjusted angularly with respect to the $O_2$–$O_2$ while simultaneously adjusting the distance between the axis of the nozzle 9' and the circumferential edge of anode 12*a*.

The mechanism for effecting such adjustment includes an internally threaded sleeve 24 affixed in vertical position to the side of means 13', a spindle having its threaded lower end received in sleeve 24, and a sleeve 26 telescoped about the unthreaded intermediate part of the spindle and held from axial motion with respect thereto by collars affixed to the spindle on either side of the sleeve. The spindle can be turned in either direction with respect to the sleeves 24 and 26 by a hand wheel 27 affixed to the upper end of the spindle. A link 29 is connected to sleeve 26 by a first pivotal joint 30 and is connected to the lower end of leaf spring 21 and thus to body 1' by a second pivotal joint 31. It will thus be seen that turning the hand wheel 27 in a first direction causes the nozzle 9' to approach the circumferential edge of anode 12*a*, and that turning of the hand wheel 27 in the opposite direction causes the nozzle to move away from the edge of the anode. A sensor 32 is shown mounted in the burner body 1', such sensor determines the degree of wearing away of the anode.

Although the invention is illustrated and described with reference to a plurality of preferred embodiments thereof, it is to be expressly understood that it is in no way limited to the disclosure of such preferred embodiments, but is capable of numerous modifications within the scope of the appended claims.

Thus although in FIG. 4 the body 13' of the anode driving means is attached to fixed structure and the body 1' of the burner is adjusted angularly with respect thereto, in a further, unillustrated embodiment the body 1' of the burner is attached to fixed structure, and the body 13' of the anode driving means is adjusted angularly with respect to the body 1'.

We claim:

1. A process of radial stabilization and homogenization of a plasma stream with a concentration of charged particles between $2.00\times10^{24}$ and $0.3\times10^{23}$ per cubic centimeter in number and with a temperature between 15,000° K and 60,000° K, wherein the arc is created between the front surface of a rod cathode arranged in an arc chamber of a plasma burner and an anode arranged outside the arc chamber, the arc passes through at least two orifice plates, the arc is stabilized by a cooling eddy of liquid led in a tangential direction into at least one of the spaces between the orifice plates or the orifice plates and the nozzle, the arc passes through the nozzle hole, and after leaving the nozzle hole the arc is bent in one direction toward the perimetric anode surface lying out of the main outlet plasma stream emitted from the nozzle.

2. In an arc liquid stabilized plasma burner, said burner having an arc chamber, a rod cathode protruding into the arc chamber, a nozzle arranged in the wall of the chamber, and an anode arranged spaced from the nozzle, the improvement wherein the anode is placed outside the arc chamber and is formed as a rotational body the axis of rotation of which includes with the axis of the circular hole of the hozzle, an angle smaller than 20°, the perimetric surface of the rotational anode is placed in the vicinity of the circular hole of the nozzle, the distance between the perimetric surface of the anode and the axis of the circular hole of the nozzle being at least equal to or larger than the radius of the circular hole of the nozzle, and smaller than the radius of the forward-active surface of the rod cathode at the arc.

3. A plasma burner according to claim 2 wherein the perimetric surface of the rotational anode is cylindrical.

4. A plasma burner according to claim 2, wherein the perimetric surface of the rotational anode is frusto conical, said surface converging in a direction away from the nozzle.

5. A plasma burner according to claim 2, comprising a first casing enclosing the arc chamber, means for supporting and drivingly rotating the anode, a second housing enclosing said last named means, and means adjustably connecting said two housings, so that the angle between the axes of the two housings may be adjusted.

6. A plasma burner according to claim 5, wherein said connecting means also permits the adjustment of said two axes toward and away from each other.

7. A plasma burner, according to claim 2, wherein the point on the rotational anode which is closest to the axis of the circular hole of the nozzle is displaced from a plane passing through such axes in a direction opposite the direction of rotation of the anode.

8. A plasma burner according to claim 2, comprising a housing containing the arc chamber of the burner, a rod cathode, means for progressively feeding the rod cathode into the arc chamber, at least two orifice plates spaced from each other through which the plasma stream passes, and a nozzle through which the plasma stream, after having passed through the orifice plate, leaves the housing, and means for forming an arc-cooling eddy of liquid in at least one of the spaces between the orifice plates or the orifice plates and the nozzle.

* * * * *